United States Patent Office 2,726,493
Patented Dec. 13, 1955

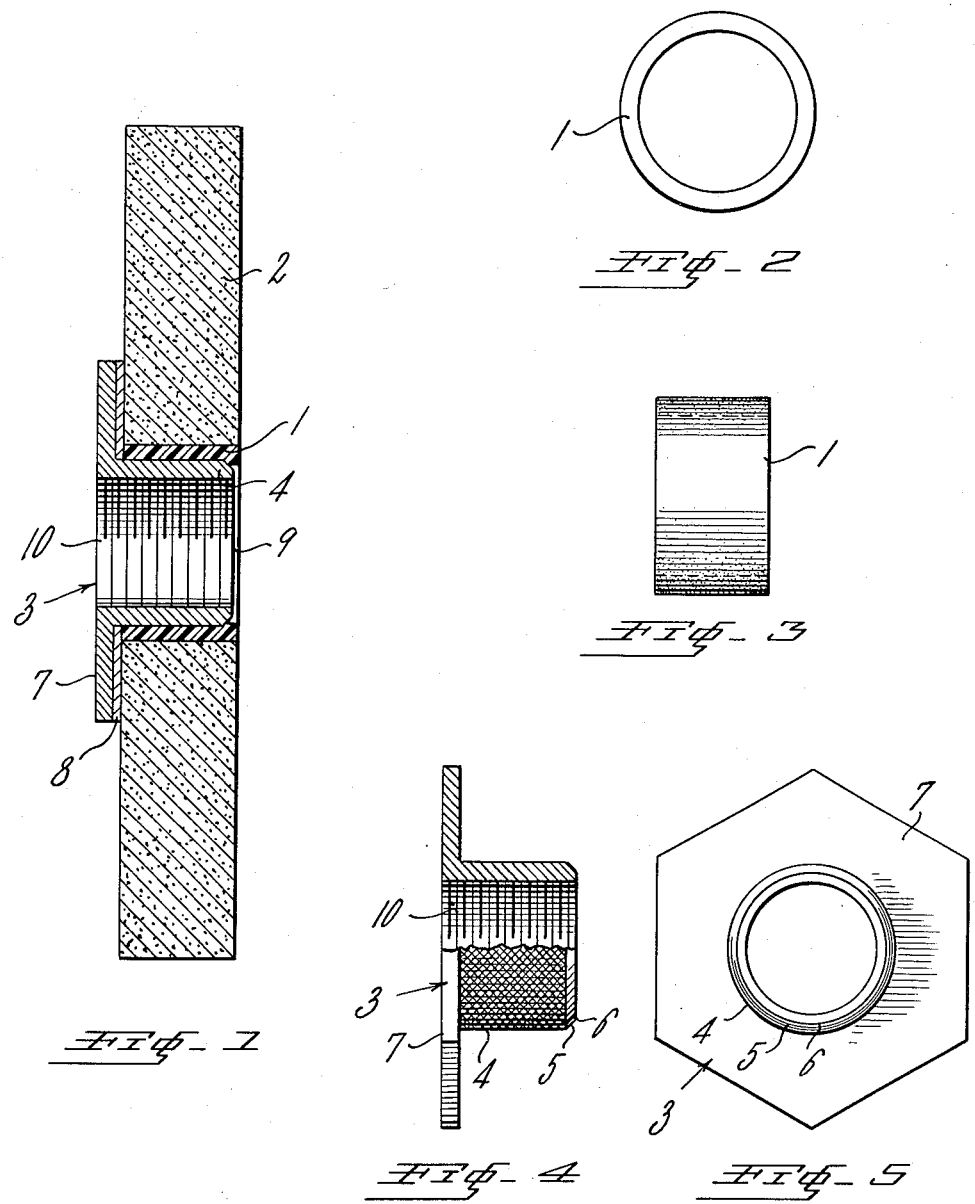

2,726,493

GRINDING WHEEL MANUFACTURE

Thomas C. Young, Churubusco, and Thomas B. Preston, Fort Wayne, Ind., assignors to United States Rubber Company, New York, N. Y., a corporation of New Jersey Application December 15, 1953, Serial No. 398,249

5 Claims. (Cl. 51—168)

This invention relates to the manufacture of grinding wheels and more particularly to improvements in such manufacture whereby the stock required to be maintained by the manufacturer is greatly reduced, whereby great savings in mold costs are achieved, and whereby greater safety in wheel operation is brought about.

Under prior practice, grinding wheels are produced with arbor holes of many sizes as required to meet the needs of the users. The necessity of manufacturing wheels having many different sizes of arbor holes, coupled with many variations in the wheels themselves, such as thickness, outside diameter, type of abrasive grain, grain size, openness or coarseness of texture, etc., has compelled the manufacturer to maintain an undesirably large stock of wheels ready for use in filling orders. This has resulted in high warehousing charges and in high inventory costs. In addition, under prior practice it was necessary to maintain a large number of molds to manufacture wheels having the many different arbor hole sizes, which involved excessive capital investment and excessive mold maintenance costs.

The principal object of the present invention is to make it readily possible for the grinding wheel manufacturer to greatly reduce the stock of wheels and the supply of molds required and yet to be able to quickly and expeditiously fill orders for any type of wheel with any diameter of arbor hole. Another object is to produce a grinding wheel which is sturdier and safer in use. Numerous other objects and advantages of our invention will become apparent from the following description taken in conjunction with the accompanying drawing in which:

Fig. 1 is a central sectional vew of a grinding wheel manufactured in accordance with our invention;

Figs. 2 and 3 are end and side views, respectively, of the thin-walled plastic hole liner used in the practice of our invention; and Figs. 4 and 5 are sectional and end views, respectively, of the adapter insert of our invention.

In practicing our invention we prepare a stock of grinding wheels 2 having the desired variations in thickness, outside diameter, grain structure, etc., and all having the same inner diameter. These wheels differ from prior art wheels by having a thin-walled plastic ring 1 firmly bonded into their center holes by a technique presently to be described and for a purpose which will appear more fully below.

These wheels with the plastic ring at their center are made as follows. A conventional mixture of abrasive grains and a curable binder, typically comprising a vulcanizable rubber and vulcanizing ingredients or a thermosetting resin such as a phenol-aldehyde resin or a polyester resin, or a rubber-resin blend, is formed into the desired annular shape, using conventional techniques except that there is provided at the center of the uncured abrasive grain-binder mixture a thin-walled plastic liner 1. This assembly is then subjected to conditions which cure the wheel binder. The heat applied for the purpose of curing the binder also effects tenacious bonding of the plastic liner 1 along its outer face to the inner face of the grinding wheel 2. Plastic liner 1 can be made of any plastic material having sufficient strength in the final wheel assembly and having the ability to be bonded tightly to the abrasive wheel when the binder of the latter is cured. We have obtained unusually satisfactory results with liners 1 made of laminated thermosetting phenol-aldehyde resin by impregnating a base material, such as paper, with a synthetic varnish containing the "A" or "B" stage thermosetting phenolic resin, wrapping this impregnated sheet around a mandrel to specified inside and outside diameters, and effecting bonding and curing of the phenolic resin (conversion to the "C" stage) by the application of heat and pressure, the resulting tube being cut to the desired length corresponding to the thickness of the grinding wheel 2.

Although the thermosetting resin in the plastic liner 1 is usually substantially fully cured before introduction of liner 1 into the grinding wheel, it could be only partially cured, curing of its resin content being completed at the same time as curing of the wheel binder. Such use of a partially cured plastic liner gives even tighter bonding between the liner 1 and wheel 2.

Although we believe that best results are obtained when the wheel binder contains a thermosetting resin of the same general type as the plastic liner 1, for example when the wheel binder consists of or contains a substantial proportion of a thermosetting phenol-aldehyde resin and plastic liner 1 contains a resin of the same general type, nevertheless we are not restricted to such practice but may use a wheel binder composed of rubber or of polyester resins in conjunction with a plastic liner 1 containing a phenolic resin.

In practicing our invention, we also prepare a stock of adapter inserts 3 which comprise a cylindrical ring portion 4 all having the same outside diameter, which outside diameter is slightly larger than the original inside diameter of plastic liners 1. Typically the outside diameter of cylindrical portion 4 of inserts 3 is from 0.002 to 0.005" larger than the inside diameter of plastic liners 1, it having been found by experience that a difference of this magnitude gives excellent results and in particular gives a good tight press fit when insert 3 is pressed into the wheel in the manner shown in Fig. 1, this tight fit being maintained for the life of the wheel.

The outer surface of cylindrical portion 4 of the adapter 3 is roughened, preferably by diamond knurling, in order to form a tight mechanical bond with the plastic liner 1 when the insert is pressed into place.

The adapter insert 3 has its outer portion made with a gradually diminishing diameter for a small distance inwardly, for example by tapering as shown at 5, in order to facilitate the introduction of the insert into the plastic liner 1. Preferably the diameter of ring portion 4, measured at the extreme outward portion, as at 6, is slightly less than the inside diameter of liner 1. Instead of tapering, as shown in Figs. 1, 4 and 5, the otherwise sharp edge of portion 4 may be rounded.

Metal insert 3 is preferably provided with integral flange portion 7 which in the final wheel, as portrayed in Fig. 1, extends in close parallel relationship with one face of the grinding wheel. In use the adapter insert 3 is pressed into the wheel until the inner surface of flange 7 is in contact with the grinding wheel or, in the preferred embodiment portrayed in the drawing, is in snug contact with an annular disk 8 of yielding or compressible paper, e. g., blotting paper of the type commonly used between metal flanges and grinding wheels in the art. Paper disk 8 also absorbs shock and expansion and contraction effects of heat on the wheel 2 and flange 7.

The cylindrical portion 4 of the adapter insert 3 is slightly less in length than the thickness of the grinding wheel as indicated at 9, thus allowing the adapter insert to act as a flange and "grip" the wheel. It will be understood of course that while insert 3 is being pressed into position the wheel will be supported in a manner such as to prevent the plastic liner 1 from being pressed out or otherwise injured.

Preferably the bore of the adapter insert 3 is interiorly threaded as indicated at 10 to engage a correspondingly threaded drive shaft. However, for some installations the bore of the insert may be smooth.

The flange 7 of the adapter insert 3 can be of a polygon shape as shown in Fig. 5 to enable it to be turned with a wrench. Alternatively, it can be round and slotted to receive a spanner wrench. In this way tightening of the wheel onto a threaded drive shaft (where the inside surface of insert 3 is threaded) and removal of the worn grinding wheel stub after use are greatly facilitated.

Use of the plastic liner 1 is highly advantageous because it absorbs the expansion and contraction due to heat of grinding. The plastic liner also absorbs a substantial amount of shock from grinding and from grinding wheel abuse.

The arbor bushings used in grinding wheels are commonly recessed into the wheels and thus are not afforded the strength of the full cross section of the bonded abrasive in the wheel. In contrast, in the preferred embodiment of our invention portrayed in Fig. 1 of the drawing, the flange portion 7 of the adapter insert rests securely against the outer face of the grinding wheel and utilizes all of the cross sectional strength of the bonded abrasive in the wheel lying under the flange.

Wheels made in accordance with our invention lend themselves to ready installation on conventional drive shafts. The usual design of the drive shaft incorporates a flat, unrelieved flange against which the wheel back is snubbed when the wheel having an internally threaded adapter insert 3 is threaded onto the shaft, using any suitable wrench applied to flange 7 to effect final tightening. In mounting a wheel embodying our adapter insert 3, the flanged side of the insert 3 is opposite the flange on the drive shaft and the torque of normal operation tends to tighten the insert and at the same time to hold the wheel more securely between the flanged elements. This contributes to the safety of operation. The safety of operation is further enhanced by the fact that flange 7 of insert 3 has a flat bearing surface which cooperates with the flat bearing surface of the usual shaft flange to eliminate unsafe operating conditions which have often prevailed in the past.

In the case of an adapter insert 3 which is not threaded, the same mounting system is used except that a nut of any suitable type is applied on the outside of adapter insert 1.

It will be understood that the adapter insert 3, through the "mechanical bond" formed in pressing the adapter insert in place, becomes a permanent part of the wheel.

From the foregoing it will be seen that by simply maintaining a stock of the plastic-lined wheels of the various wheel sizes and types and a stock of adapter inserts having the required inside diameters, when an order for a wheel of a specific type or size adapted to fit a specific arbor is received, the manufacturer merely selects the proper wheel and the proper adapter insert and presses the latter into place by a simple operation. The wheel is then ready to be shipped.

The use of the present invention gives versatility of arbor hole sizes to a given grinding wheel and enables the manufacturer to greatly reduce his inventory as explained above. More importantly, the invention effects great savings in mold costs because alternate mold parts were heretofore required to manufacture wheels having the various arbor hole sizes. The use of the invention simplifies certain manufacturing processes and produces a safer wheel. The increased safety brought about by our invention is very important. Under the stress of grinding, and the torque generated, an imbedded steel bushing of the type commonly used in grinding wheels is sometimes torn loose from the body of the wheel. With a wheel made in accordance with our invention, the flange area 7 of the adapter insert acts in part as a driving flange, distributing the forces applied over a larger surface area. In addition, in the conventional wheel, occasional poor adhesion of the wheel proper to the imbedded steel bushing increases the likelihood of the bushing being torn loose. With our invention, the "mechanical bond" achieved on pressing the insert into position is extremely good, and, in the case of an internally threaded insert 3, is actually increased by the pressure of the flange area 7 upon the wheel face as the torque increases. Many other advantages of our invention will be obvious to those skilled in the art.

Having thus described our invention, what we claim and desire to protect by Letters Patent is:

1. A grinding wheel structure comprising an annular grinding wheel formed of a cured mixture of abrasive grains and a curable organic plastic binder, an annular plastic-containing ring located in the center hole of said wheel and tightly bonded to the wheel by curing said mixture while said ring is in position, and a metallic adapter insert comprising a hollow cylindrical ring portion which has a roughened exterior and is tightly held within said plastic-containing ring by frictional engagement therewith and an annular flange portion which is integral with said ring portion, extends in parallel relationship along one side of said wheel and presses tightly against said side.

2. A structure as set forth in claim 1 wherein said ring portion of said adapter insert is interiorly threaded to engage a threaded drive shaft.

3. A grinding wheel structure comprising an annular grinding wheel formed of a cured mixture of abrasive grains and a curable organic plastic binder, an annular plastic-containing ring composed of layers of paper impregnated with and laminated together with a thermosetting phenolic resin cured under heat and pressure, said plastic-containing ring being located in the center hole of said wheel and tightly bonded to the wheel by curing said mixture while said ring is in position, and a metallic adapter insert having a hollow cylindrical ring portion which has a roughened exterior and is tightly held within said plastic-containing ring by frictional engagement therewith.

4. A grinding wheel structure comprising an annular grinding wheel formed of a mixture of abrasive grains and a binder, an annular plastic-containing ring located in the center hole of said wheel and tightly bonded to the wheel, and a metallic adapter insert comprising a hollow cylindrical portion which has a roughened exterior and is tightly held within said plastic-containing ring by a press fit and mechanical bond therebetween and an annular flange portion which is integral with said ring portion, extends in parallel relationship along one side of said wheel and presses tightly against said side.

5. A grinding wheel structure comprising an annular grinding wheel formed of a mixture of abrasive grains and a binder, an annular plastic-containing ring composed of layers of paper impregnated with and laminated together with a thermosetting resin, said plastic-containing ring being located in the center hole of said wheel and tightly bonded to the wheel, and a metallic adapter insert comprising a hollow cylindrical portion which has a roughened exterior and is tightly held within said plastic-containing ring by a press fit and mechanical bond therebetween and an annular flange portion which is integral with said ring portion, extends in parallel relationship along one side of said wheel and presses tightly against said side.

(References on following page)

References Cited in the file of this patent

UNITED STATES PATENTS

| | | |
|---|---|---|
| 158,617 | Bannister et al. | Jan. 12, 1875 |
| 942,808 | Baekeland | Dec. 7, 1909 |
| 2,304,226 | Work et al. | Dec. 8, 1942 |
| 2,397,849 | Engeln | Apr. 2, 1946 |
| 2,519,035 | Esty | Aug. 15, 1950 |
| 2,555,279 | Taylor | May 29, 1951 |
| 2,562,327 | Moore | July 31, 1951 |
| 2,666,307 | Higert | Jan. 19, 1954 |